United States Patent [19]

Cheon

[11] Patent Number: 5,241,258

[45] Date of Patent: Aug. 31, 1993

[54] HIGH-SPEED BATTERY CHARGING DEVICE AND A CONTROL CIRCUIT THEREFOR

[75] Inventor: Kyeongyong Cheon, Kyunggi, Rep. of Korea

[73] Assignee: Samsung Electronics Co., Ltd., Kyunggi, Rep. of Korea

[21] Appl. No.: 871,811

[22] Filed: Apr. 22, 1992

[30] Foreign Application Priority Data

Nov. 1, 1991 [KR] Rep. of Korea .................... 91-19450

[51] Int. Cl.$^5$ ............................... H02J 7/04
[52] U.S. Cl. ........................................ 320/23; 320/39
[58] Field of Search .................... 320/20, 21, 22, 23, 320/24, 31, 32, 40, 39

[56] References Cited

U.S. PATENT DOCUMENTS

| | | | |
|---|---|---|---|
| 3,795,818 | 3/1974 | Beawas et al. | 320/39 X |
| 4,035,709 | 7/1977 | Seider et al. | 320/23 |
| 4,386,308 | 5/1983 | Emile, Jr. et al. | 320/22 |
| 4,394,611 | 7/1983 | Fallon et al. | 320/21 |
| 4,433,277 | 2/1984 | Carollo et al. | 320/24 |
| 4,467,265 | 8/1984 | Hierholzer, Jr. | 320/24 X |
| 4,513,238 | 4/1985 | Orban | 320/23 |
| 4,609,861 | 9/1986 | Inaniwa et al. | 320/23 |
| 4,727,306 | 2/1989 | Misak et al. | 320/20 X |
| 4,888,544 | 12/1989 | Terry et al. | 320/37 |
| 4,992,720 | 2/1991 | Hata | 320/23 |
| 5,019,767 | 5/1991 | Shirai et al. | 320/2 |
| 5,130,634 | 7/1992 | Kasai | 320/22 |

FOREIGN PATENT DOCUMENTS

| | | |
|---|---|---|
| 0184054 | 5/1992 | Taiwan . |
| 1362289 | 8/1974 | United Kingdom . |
| 1509567 | 5/1978 | United Kingdom . |
| 2091502 | 7/1982 | United Kingdom . |
| 8805222 | 7/1988 | World Int. Prop. O. . |

Primary Examiner—Kristine L. Peckman
Attorney, Agent, or Firm—Watson, Cole, Grindle & Watson

[57] ABSTRACT

A battery charging device providing both a rapid high charging rate and a trickle rate for a substantially fully charged battery and employing first, second and third rectifying circuits for rectifying an AC current into a DC current; a charging state switch circuit for outputting information about the charging-state switching of the battery between a high charging rate and a trickle charge rate; charging driving circuits for outputting a driving signal representing high speed charging or trickle charging in accordance with the output of the charging state switch circuit; a charging circuit for performing high speed charging or trickle charging in response to the driving signal; an auxiliary controlling circuit for controlling the battery to be charged with a regulating current during a rapid high charging rate; a battery mounting sensing circuit for sensing the mounting of a battery to be charged; a charging state indicating circuit for indicating a rapid high charging rate of the battery mounting sensing circuit and the charging driving circuit; and a relay controlling circuit for controlling the driving of a relay in the auxiliary controlling circuit.

8 Claims, 2 Drawing Sheets

HIGH-SPEED BATTERY CHARGING DEVICE AND A CONTROL CIRCUIT THEREFOR

BACKGROUND OF THE INVENTION

1. Field of the Invention

This invention relates to a high-speed battery charging device having a control circuit, and more particularly to such a device and control circuit which quickly charges a battery at a high charging rate where the battery is in a low charged state, and which provides a trickle charge where the battery is in a fully charged state.

Prior art battery charging devices have the disadvantage that it takes too much time to charge, because the battery is charged by too small a current. Such low speed charging of the battery is inconvenient and is disadvantageous because of inefficient use of energy.

A device for charging a battery at a high speed has been invented to solve the disadvantages caused by the above low speed charging of the battery. However, the conventional device that quickly charges the battery only at a high charging rate does not prevent the battery from being overcharged. Thus, the battery is overcharged due to continual charging, though the battery is already fully charged. So the above disadvantage causes the life span of the battery to become shortened and energy is wasted by being overcharged.

SUMMARY OF THE INVENTION

Therefore, a primary object of the invention is to provide a high speed battery charging device having a control circuit, which quickly charges a battery at a high charging rate where the battery is in a low-charged state and which provides a trickle charge where a battery is in the fully charged state, and is a device for solving the disadvantages of the above-discussed battery between the high charging rate and the trickle charge rate charging devices.

To accomplish the above-mentioned objects, the present invention comprises first, second and third rectifying sections which rectify an AC voltage into a DC voltage; a charging state switch-section which outputs information about the charging state switching of a battery; a charging circuit driving section which outputs a driving signal for either the high charging rate or trickle charging of the charging state switch-section; a charging circuit section which performs high speed charging or trickle charging by the charging circuit driving section; an auxiliary controlling section which controls the charging circuit section for the battery being charged at a constant current at the time of high speed charging; a battery mounting sensing section which senses whether or not the battery is mounted; a charging state indicating section which indicates the high speed charging of the battery mounting sensing section and the charging circuit driving section; and a relay controlling section which controls the operation of a relay.

BRIEF DESCRIPTION OF THE DRAWINGS

The above objects, features and advantages of the subject invention are believed to be readily apparent from a consideration of the following description of a preferred embodiment of the best mode of carrying out the invention when in conjunction with the following drawings, wherein.

DETAILED DESCRIPTION OF A PREFERRED EMBODIMENT

Figure 1A:
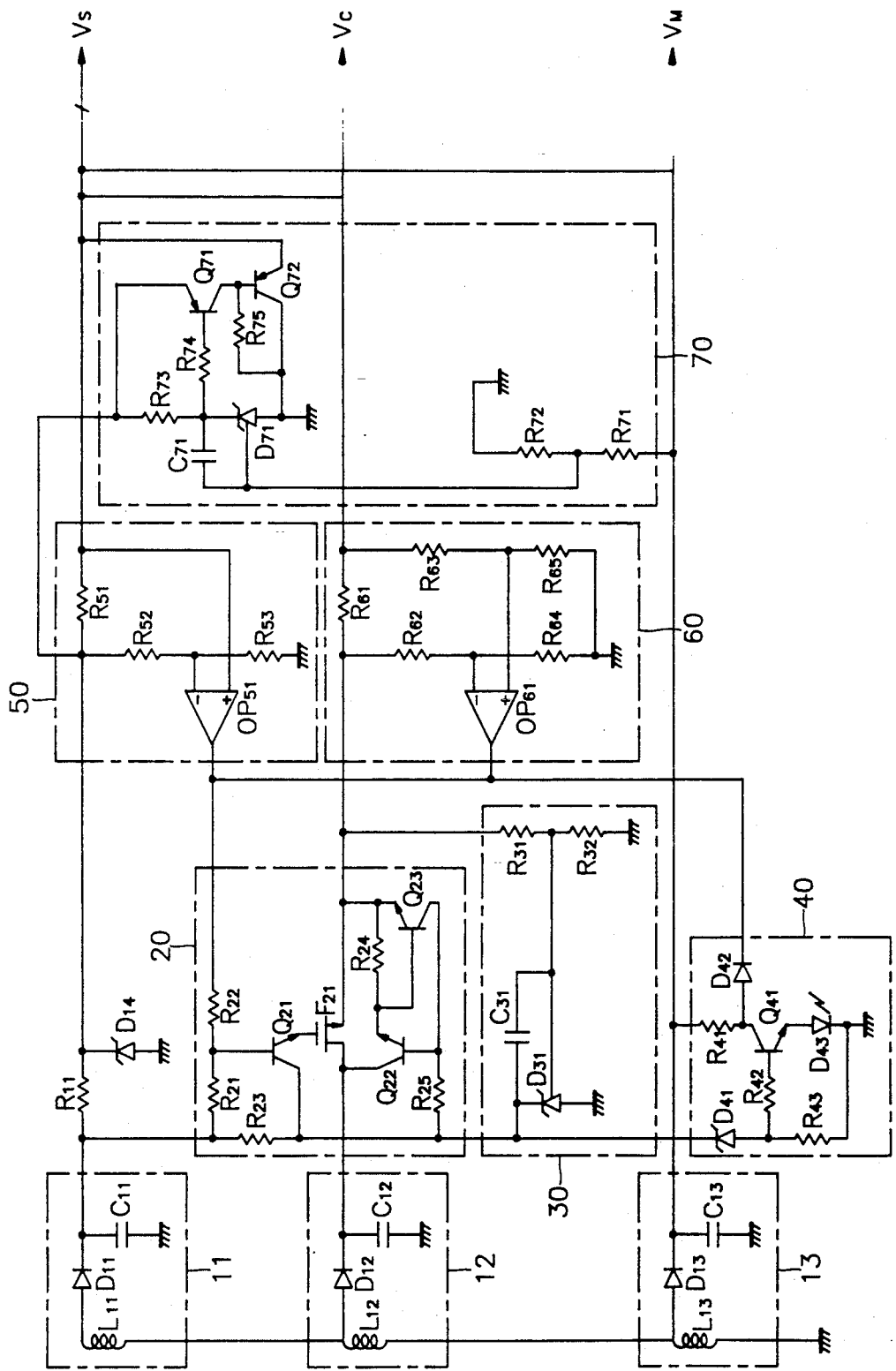
FIG. 1A is a detailed circuit diagram of a high charging rate battery device having a control circuit according to the embodiment of the present invention.
Figure 1B:
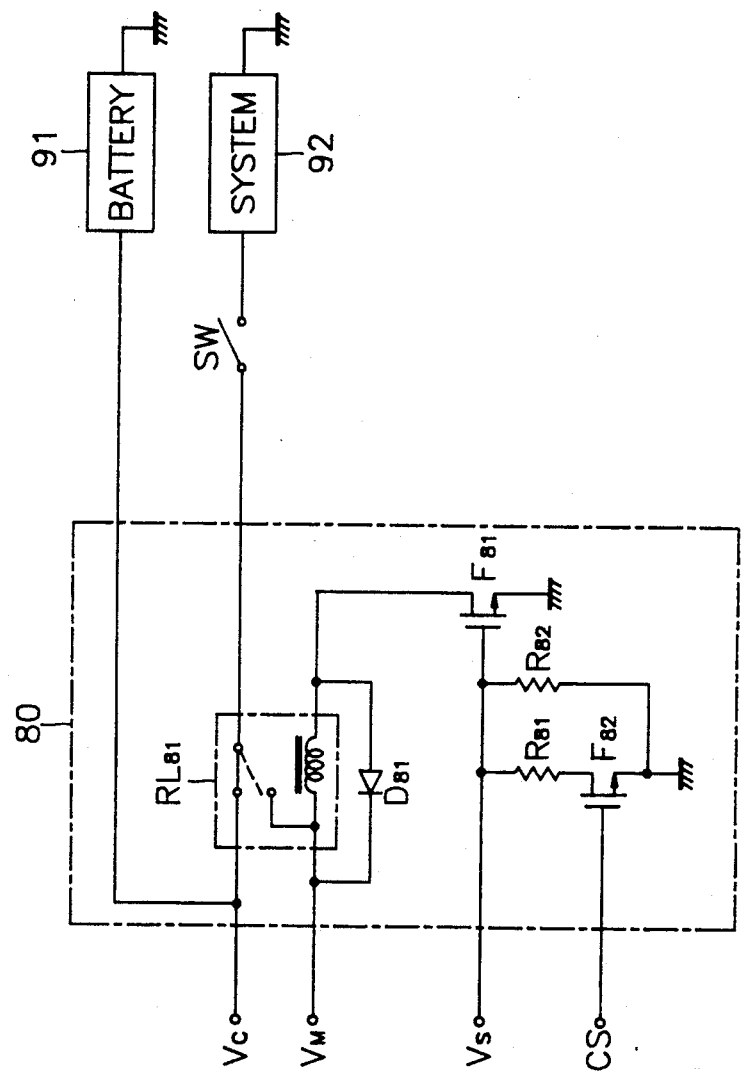
FIG. 1B is a detailed circuit diagram of a charging state switching-section according to the present invention.

As shown in FIGS. 1A and 1B, a high speed battery charging device includes a control circuit according to the invention comprising first, second and third rectifying sections 11, 12 and 13; a charging state switching section 80; a charging circuit driving section 50; a charging circuit section 20; an auxiliary controlling section 60; a battery mounting sensing section 30; and a relay controlling section 70.

The first, second and third rectifying sections 11, 12 and 13 comprise a transformer L11, L12 or L13 connected to an AC input voltage source (not shown); rectifying diodes D11, D12 or D13 each having an anode thereof connected respectively to the secondary coils of transformers L11, L12 and L13; and a smoothing capacitor C11, C12, C13 with one terminal thereof connected to the cathode of the respective rectifying diode D11, D12 or D13, and with the other terminal thereof connected to ground.

The charging circuit section 20 comprises: resistors R21, R23 with the common node thereof connected to the cathode of the rectifying diode D14 of the first rectifying section 11; a first transistor Q21 with a base terminal connected to the other terminal of the resistor R21 and with a collector terminal connected to the other terminal of resistor R23; a field effect transistor (FET) F21 with a gate terminal connected to the emitter of the first transistor Q21 and with a drain terminal connected to the cathode of the rectifying diode D12 of the second rectifying section 12; a resistor 22 with one terminal thereof connected to the base terminal of the first transistor Q21; a resistor R25 with one terminal thereof connected to the collector terminal of the first transistor Q21; a second transistor Q22 with the collector terminal connected to the drain terminal of the FET F21 and with the base terminal connected to the other terminal of the resistor R25; a third transistor Q23 with the base terminal connected to the emitter terminal of the second transistor Q22, with the collector terminal connected to the base terminal of the second transistor Q22 and with the emitter terminal connected to the source terminal of the FET 21; and a resistor R24 connected between the emitter terminal of the third transistor Q23 and the base terminal.

The battery mounting sensing section 30 comprises: a resistor R31 with one terminal thereof connected to the emitter terminal of the third transistor Q23 of the charging circuit section 20; a resistor 32 with one terminal thereof connected to the other terminal of the resistor R31 and with the other terminal thereof connected to ground; a shunt regulator D31 with a shunt terminal thereof connected to the contact point of the resistor R31, R32 and with an anode connected to ground; and a capacitor C31 with one terminal thereof connected to the shunt terminal of the shunt regulator D31 and with the other terminal thereof connected to the cathode of the shunt regulator D31. A TL431 chip is used as a shunt regulator in the preferred embodiment of the present invention, but other functionally equivalent chips may also be used.

The charging state indicating section 40 comprises a zener diode D41 with a cathode thereof connected to the cathode of the shunt regulator D31 of the battery mounting sensing section 30; resistors R42, R43 with the common node thereof connected to the anode of the zener diode D41; a resistor R41 with one terminal thereof connected to the cathode of the rectifying diode D13 of the third rectifying section 13; a diode D42 with the anode thereof connected to the other terminal of the resistor R41; a transistor Q41 with the collector terminal thereof connected to the anode of the diode D42, and with the base terminal thereof connected to the other terminal of the resistor R42; and a light emitting diode (LED) D43 with the anode thereof connected to the emitter terminal of the transistor Q41, and with the cathode thereof connected to ground.

The charging circuit driving section 50 comprises: resistors R51, R52 with the common node thereof connected to the cathode of the zener diode D14 which passes through the first rectifying section 11 and the resistor R11; a voltage comparator OP1 with an inverting terminal thereof connected to the other terminal of the resistor R52, and with a non-inverting terminal connected to the other terminal of the resistor R51; and a resistor R53 with one terminal thereof connected to the inverting terminal of the voltage comparator OP1, and with the other terminal thereof connected to ground.

The auxiliary controlling section 60 comprises: resistors R61, R62 with the common node thereof connected to the emitter terminal of the third transistor Q23 of the charging circuit section 20; resistor R63 with one terminal connected to the other terminal of the resistor R61; a voltage comparator OP61 with an inverting terminal thereof connected to the other terminal of the resistor R62, and with a non-inverting terminal thereof connected to the other terminal of the resistor R63; and resistors R64, R65 with the common node thereof connected to the inverting terminal and the non-inverting terminal of the voltage comparator OP61, and with respectively the other terminal thereof connected to ground.

The relay controlling section 70 comprises: a resistor R71 with one terminal thereof connected to the cathode of the rectifying diode D13 of the third rectifying section 13; resistor R72 with one terminal thereof connected to the other terminal of the resistor R71, and with the other terminal thereof connected to ground; a shunt regulator D71 with a shunt terminal thereof connected to the contact point of the resistors R71,R72, and with an anode thereof connected to ground; a capacitor C71 with one terminal thereof connected to the shunt terminal of the shunt regulator D71, and with the other terminal thereof connected to the cathode of the shunt regulator D71; resistors R73, R74 with the common node thereof connected to the cathode of the shunt regulator D71; a first PNP type transistor Q71 with a collector terminal thereof connected to the other terminal of the resistor R73, and with a base terminal thereof connected to the other terminal of the resistor R74; a second PNP type transistor Q72 with a base terminal thereof connected to the collector terminal of the first PNP type transistor Q72, and with the collector terminal thereof connected to ground; and a resistor R75 with one terminal thereof connected to the base terminal of the second PNP type transistor Q72, and with the other terminal thereof connected to ground.

A combined block/schematic diagram of the charging state switch-section 80 in accordance with the preferred embodiment of the invention is shown in FIG. 1B. The charging state switch-section 80 comprises a contact type relay RL81 with a make before break (MBB) contact input terminal thereof connected to the common node of the resistors R61, R63 of the auxiliary controlling section, and with a coil input terminal thereof connected to the cathode of the rectifying diode D13 of the third rectifying section 13; a diode with the anode thereof connected to the coil input terminal of the MBB contact type relay RL81; a first FET F81 with the drain terminal thereof connected to the coil output terminal of the MBB contact type relay RL81, with a gate terminal thereof connected to the non-inverting terminal of the voltage comparator OP51 of the charging circuit driving section 50 and with a source terminal thereof connected to ground; resistors R81, R82 with the common node thereof connected to the non-inverting terminal of the voltage comparator OP51 of the charging circuit driving section 50, and with a source terminal there of connected to ground; resistors R81, R82 with the common node thereof connected to the non-inverting terminal of the voltage comparator OP51 of the charging circuit driving section 50, and a second FET F82 with a drain terminal thereof connected to the other terminal of the resistor R81, with a gate terminal thereof connected to a charging state sensing signal line CS, and with a source terminal thereof connected to ground.

The operation of high-speed battery charging device having a control circuit according to the embodiment of the present invention as described above is as follows.

If AC power is applied to the first, the second and the third rectifying section 11, 12, 13, the current that passed through the first rectifying section passes through resistors R11, R51, and is input to the gate terminal of the first FET F81 of a charging state switch-section 80. Then the first FET F81 is turned ON.

Accordingly, the current which passed through the third rectifying section 13 is applied to the MBB contact type relay RL81 of the charging state switch-section 80, and current flows in the coil terminal of the MBB contact type relay RL81.

If the current flows in the coil terminal of the MBB contact type relay RL81, the switch of the MBB contact type relay RL81 is connected to the coil input terminal, and then the current is supplied to a system 92 by the current that passed through the third rectifying section 13.

Next, the operation of the charging circuit driving section 50 will be explained. In the case where the charging state sensing signal having a low state is input to the gate terminal of the second FET F82 of the charging state switch-section 80, the second FET F82 is turned OFF. The charging state sensing signal CS is a signal received from a sensor sensing the voltage, temperature and the charging time of the battery 91. And in the case where the battery 91 is fully charged, the charging state sensing signal CS becomes high; however, it becomes low for a battery in a discharged state. If the second FET F82 is turned OFF, the potential of the non-inverting terminal of the voltage comparator OP51 of the charging circuit driving section becomes $V_{D14} \cdot R82/(R82+R51)$, and the potential of the inverting terminal becomes $V_{D14} \cdot R53/(R52+R53)$. At this time, if the potential of the non-inverting terminal of the voltage comparator OP51 is designed to have the larger values of the resistors R52, R53 than those of the potential of the inverting terminal, the output of the voltage comparator OP51 becomes high. The charging circuit section 20 operates as a high-speed charging circuit at this time.

Additionally, in the case where the charging state sensing signal CS is input to the gate terminal of the first FET F81 of the charging state switch section, the second FET F82 is turned ON. If the second FET F82 is turned ON, the potential of the non-inverting terminal of the voltage comparator OP51 of the charging circuit driving section 50 becomes $V_{D14} \cdot [R81//R82]/[(R81//R82)+R51]$, and the potential of the inverting terminal becomes $V_{D14} \cdot R53/(R52+R53)$. In the case where the charging state sensing signal CS is high, if the potential of the inverting terminal of the voltage comparator OP51 is made to select the smaller values of resistors R51, R81, R82, R52, R53 than those of the potential of the non-inverting terminal, considering the determined values of the resistors R51, R82, R52, R53 in the case where the charging state sensing signal CS is low, the output of the voltage comparator OP51 is high. At this time, the charging circuit section 20 operates as a trickle charging circuit.

The following is a description of the operation of the charging circuit section 20.

If the output of the voltage comparator OP51 of the charging circuit driving section 50 is high, the first transistor Q21 of the charging circuit section 20 is turned ON, and the FET F21 is turned ON. If the FET F21 is turned ON, the current of the second rectifying section 12 passes through the resistor R61 and is directly applied to the battery 91, accordingly the battery 91 is charged at a high charging rate. Also, as most of the current by the first rectifying section 11 which passe through the third resistor R23 passes through the first transistor Q21, the amount of current input to the base terminal of the second transistor Q22 is extremely small. Thus, the second transistor Q22 is turned OFF, and the third transistor Q23 is turned OFF.

If the output of the voltage comparator OP51 of the charging circuit driving section 50 is low, the first transistor Q21 of the charging circuit 20 is turned OFF, and the FET F21 is turned OFF. In this case the base terminal of the second transistor Q22 is biased so that the second and the third transistors Q22, Q23 are turned ON. Therefore, the current of the second rectifying section 12 is trickle-charged to the battery through a trickle current regulating resistor R24.

The operations of the battery 91 mounting sensing section 30 and the charging state indicating section 40 are explained as follows.

When a battery is mounted, the divided voltage of the resistor R32 of the voltage divider comprising the first and the second resistors R31, R32 of the battery mounting sensing section 30 has too small a value to operate a shunt regulator D31. Accordingly, the shunt regulator D31 of the battery mounting sensing section 30 is turned OFF. In this case, if the battery is not charged and is low, then the output of the voltage comparator OP51 of the charging circuit driving section 50 becomes high, and the diode D42 of the charging state indicating section 40 is turned OFF. Also, the transistor Q41 is turned ON by the current by the first rectifying section 11 flowing through the resistor R23 and the zener diode D41. The transistor Q41 is turned ON, so, LED D43 operates to indicate that the battery is being charged at a high rate.

Unlike the above, if the battery 91 is mounted and the battery 91 is fully charged, the output of the voltage comparator OP51 of the charging circuit driving section 50 becomes low, so, the diode of the charging state indicating section 40 is turned ON. Accordingly, the collector current of the transistor Q41 flows through the diode D42, and the LED D43 does not operate.

Next, the operation of auxiliary controlling section 60 is explained. The current regulating resistor R61 is used to supply the current flowing through the charging circuit section 20 as a predetermined regulating current to battery 91. At this time, the voltages of both ends of the resistor R61 are changed. The voltages of both ends of the resistor R61 are respectively distributed by the resistors R62, R64, R63, R65, and are input to the voltage comparator OP61. Thus, the voltage comparator OP61 is operated according to the changes in voltage across resistor R61. The output of the voltage comparator OP61 is connected to the output of the charging circuit driving section 50 in parallel, and controls in an auxiliary manner, the charging circuit section 20 and the charging state indicating section 40.

Next, the operation of the relay controlling section 70 is explained. Since the MBB contact type relay RL81 is operated according to the current flowing in the coil of the relay, if the current of the coil is not regulated in accordance with the characteristic of the circuit, the mis-operation of the circuit can occur. The relay controlling section 70 is the circuit for preventing such mis-operation. During the operation of power, the voltage which passed through the third rectifying section 13 is distributed by the resistors R71, R72. In this case, the values of the resistors R71, R72 are previously selected so that the divided voltage across the resistor R72 can operate the shunt regulator D71. If the shunt regulator D71 is operated, the bias is applied to the base terminal of a first PNP type transistor Q71, and the first PNP type transistor Q71 is turned ON. The first PNP type transistor Q71 is turned ON, a second PNP type transistor Q72 is turned OFF.

If the application of the power is stopped, the voltage which passed through the third rectifying section 13 starts to become small and is distributed by the resistors R71, R72, and the divided voltage across resistor R72 also becomes small. Accordingly, since the shunt regulator D71 is made not to operate and the high voltage is applied to the base terminal of the first PNP type transistor Q71, the first PNP type transistor Q71 is turned OFF. If the first PNP type transistor Q71 is turned OFF, the second first FET F81 of the charging state switch-section 80 is connected to ground. Accordingly, the first FET F81 is turned OFF, and the MBB contact type relay RL81 is switched to the initial operation state. The mis-operation of the MBB contact type relay RL81 can be prevented by the first FET F81 first being turned OFF, before the current flowing to the coil input terminal of the MBB contact type relay RL81 is stopped, as described above.

As described herein, there is provided a high-speed battery charging device having a control circuit which performs high-speed battery charging in the case where the voltage of the battery is low, and trickle charging with low current in the case that the battery is fully charged. This effect of the invention can be applied to all applications relating to high-speed battery charging.

What is claimed is:

1. A battery charging device having a control circuit, for high-speed charging at low battery voltage, and for trickle charging where a battery is fully charged, in a charging circuit of the battery, and comprising:

first, second and third rectifying means for rectifying an AC current into a DC current;

charging state switching means for outputting information about the switching of the battery between high-speed charging and trickle charging;

charging circuit driving means for outputting a driving signal representing the high speed charging or the trickle charging in accordance with the output of said charging state switch means;

charging circuit means for performing the high speed charging or the trickle charging in response to said driving signal;

auxiliary controlling means for controlling the battery to be charged with a regulating current during the high-speed charging;

battery mounting sensing means for sensing the mounting of the battery to be charged;

charging state indicating means for indicating the rate of the high speed charging of the battery; and relay controlling means for controlling the driving of a relay and responsive to said auxiliary controlling means.

2. A battery charging device as claimed in claim 1, wherein said first rectifying means includes a rectifier diode; and said charging circuit means includes first and second resistors with a common terminal thereof connected to the cathode of said rectifier diode of said first rectifying means; said charging circuit means further including a first transistor with a base terminal connected to the other terminal of said first resistor and with a collector terminal connected to the other terminal of said second resistor; an FET with a gate terminal connected to the emitter of said first transistor and a drain terminal; said second rectifying means including a rectifying diode having a cathode connected to said drain terminal of said FET; said charging circuit means further including a third resistor having one terminal connected to the base terminal of said first transistor; a second transistor having a collector terminal connected to the drain terminal of said FET and a base terminal connected to the other terminal of said third resistor; said charging circuit means further including a third transistor having a base terminal connected to the emitter terminal of said second transistor and with an emitter terminal connected to the source terminal of the FET; and a fourth resistor connected between the base and the emitter terminals of the third transistor.

3. A battery charging device as claimed in claim 2, wherein said battery mounting sensing means comprises: a fifth resistor having one terminal connected to the emitter terminal of said third transistor, a sixth resistor with a terminal connected to the other terminal of said fifth resistor and the other terminal of said sixth resistor connected to ground; a shunt regulator having a shunt terminal connected to the common terminal of said fifth and sixth resistors and with an anode connected to ground; and a capacitor connected across the cathode and said shunt terminal of said shunt regulator.

4. A battery charging device as claimed in claim 3, wherein said charging state indicating means comprises: a zener diode with a cathode thereof connected to the cathode of the shunt regulator; a seventh resistor with one terminal connected to the anode of the zener diode; an eight resistor with one terminal connected to the cathode of a rectifying diode of the third rectifying means; a diode with an anode connected to the other terminal of said eighth resistor; a fourth transistor having a collector terminal thereof connected to the anode of said diode, a ninth resistor connected between the base of said fourth transistor and the cathode of said zener diode; and a light emitting diode with the anode thereof connected to the emitter terminal of said fourth transistor, and with the cathode thereof connected to ground.

5. A battery charging device as claimed in claim 4, wherein said charging circuit driving means comprises: ninth, tenth and eleventh resistors connected in series and the common terminal of said tenth and eleventh resistors connected to the cathode of the zener diode of said first rectifying means; said device further comprising a voltage comparator with an inverting terminal thereof connected to the common terminal of said ninth and tenth resistors and a non-inverting terminal connected to the other terminal of said ninth resistor; and the other terminal of said eleventh resistor connected to ground.

6. A battery charging device as claimed in claim 5, wherein said auxiliary controlling means comprises: a second comparator having an inverting and non-inverting terminal, twelfth and thirteenth resistors and fourteenth and fifteenth resistors, respectively connected in series, the common terminal of said twelfth and thirteenth resistors being connected to the emitter of said third transistor, the common terminal of said fourteenth and fifteenth resistors being connected to said non-inverting terminal and the other terminal of said twelfth resistor connected to said inverting terminal; the other terminal of said fourteenth resistor being connected to the other terminal of said thirteenth resistor; a sixteenth resistor connected between said inverting terminal and ground and the other terminal of said fifteenth resistor being connected to ground.

7. A battery charging device as claimed in claim 6, wherein said relay controlling section comprises: seventeenth and eighteenth resistors connected in series; a fifth transistor having an emitter and base terminal respectively connected to the other respective terminal of said seventeenth and eighteenth resistors and an anode connected to ground; a capacitor connected between the cathode and shunt terminal of said regulator; a sixth transistor having an emitter providing an output signal; a nineteenth resistor connected between the base and collector of said sixth transistor, said collector being connected to ground; twentieth and twenty first resistors being connected in series and the common terminal thereof being connected to said shunt terminal.

8. The battery charging device as claimed in claim 7, wherein said charging state switching means comprises: a contact type relay with a make-before-break (MBB) contact input terminal thereof connected to the common terminal of said thirteenth and fourteenth resistors and a coil input terminal thereof connected to the cathode of said rectifying diode in said third rectifying means; a second FET having (1) a drain terminal connected to the coil output terminal of said MBB contact type relay, (2) a gate terminal connected to the non-inverting terminal of said second voltage comparator and (3) a source terminal connected to ground; a third FET having (1) a gate terminal connected to a charging state sensing signal line, (2) a source electrode connected to ground; a twenty second resistor and a twenty third resistor connected to the gate electrode of said second FET, the respective other terminal of said twenty second and twenty third resistors being connected respectively to ground and to the drain gate of said third FET and a second diode connected across the input and output terminals of said coil.

* * * * *